May 12, 1964
J. J. BAHN
3,133,145
FLEXIBLE INSULATED JOINT FOR ELECTRICAL CONDUCTORS
WITH MEANS FOR FLUID-COOLING
Filed Oct. 26, 1962
2 Sheets-Sheet 1
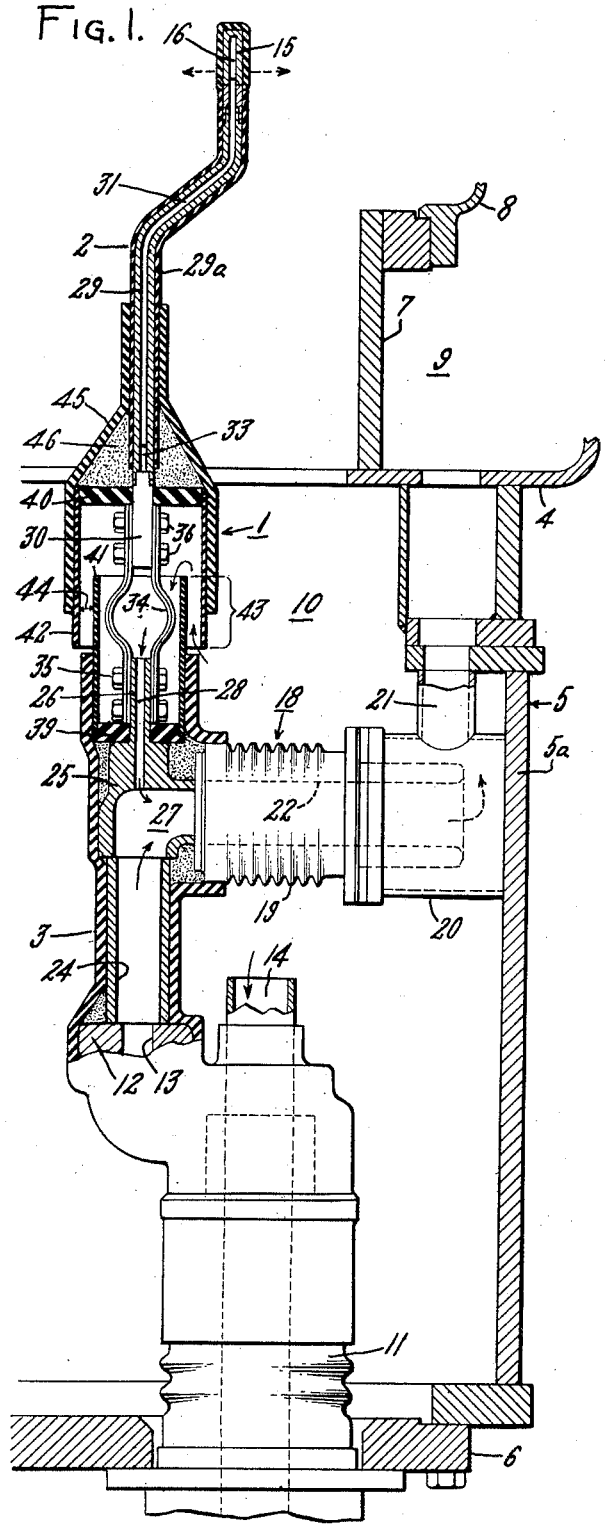
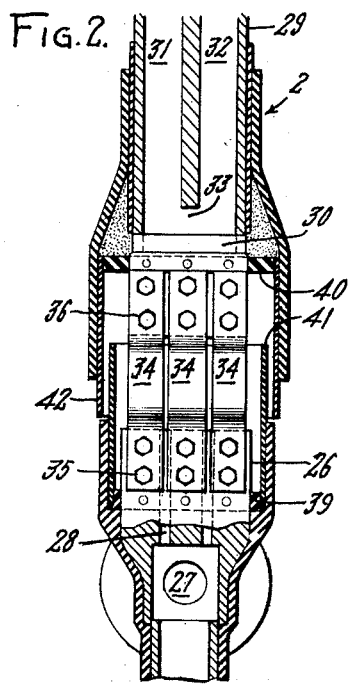
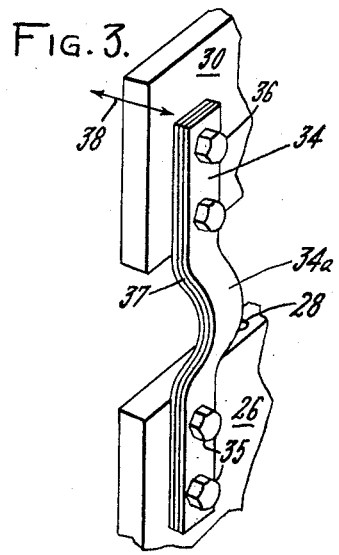
INVENTOR
JOHN J. BAHN
BY W. C. Cutcher
HIS ATTORNEY May 12, 1964
J. J. BAHN
3,133,145
FLEXIBLE INSULATED JOINT FOR ELECTRICAL CONDUCTORS
WITH MEANS FOR FLUID-COOLING
Filed Oct. 26, 1962
2 Sheets-Sheet 2
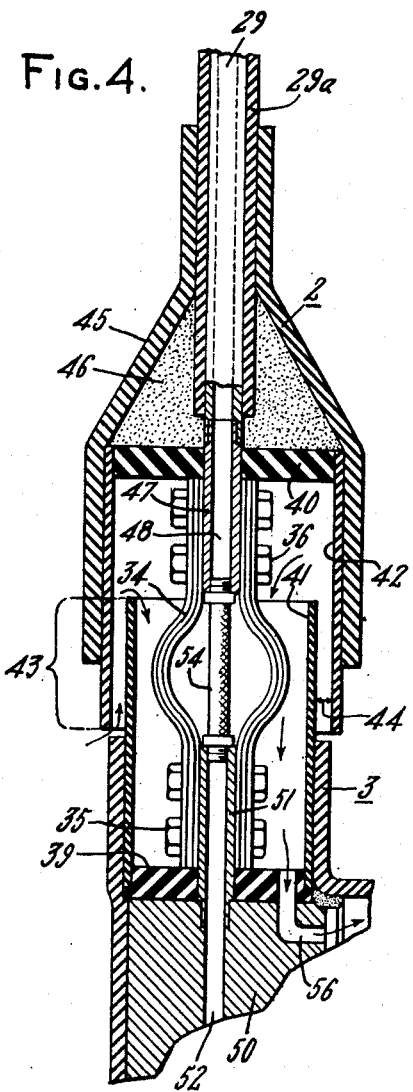
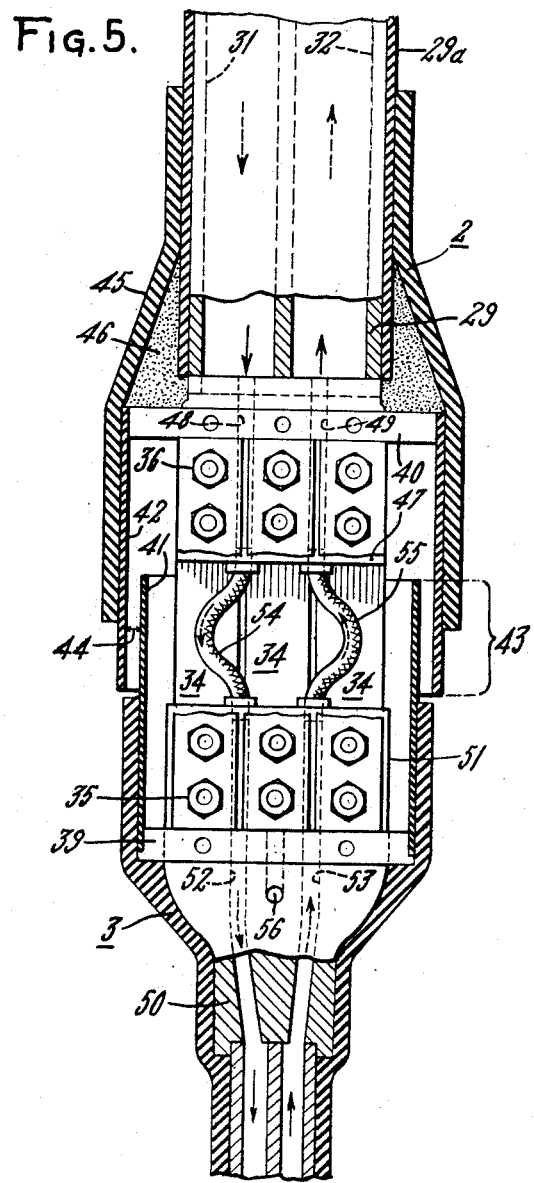
INVENTOR
JOHN J. BAHN
BY W. C. Crutchen
HIS ATTORNEY United States Patent Office 3,133,145
Patented May 12, 1964

3,133,145
FLEXIBLE INSULATED JOINT FOR ELECTRICAL CONDUCTORS WITH MEANS FOR FLUID-COOLING
John J. Bahn, Schenectady, N.Y., assignor to General Electric Company, a corporation of New York
Filed Oct. 26, 1962, Ser. No. 233,335
5 Claims. (Cl. 174—15)

This invention relates to a flexible insulated joint for high voltage electrical conductors with means for cooling the members in the vicinity of the joint with a fluid, the assembly being particularly applicable for use as part of the lower lead in a fluid-cooled dynamo electric machine.

Fluid-cooled dynamo electric machines, such as very large gas or liquid-cooled turbine generators, may have high voltage windings connected to arcuate conductors at the end of the generator called "connection rings," which may move with respect to the stationary generator structure due to thermal expansion and contraction. The connection rings are connected to the external electrical bushings by means of "lower leads," which must allow this relative movement between the connection rings and the bushings. The lower leads must also be insulated against very high voltages and, due to the rigidity of very high voltage insulation, the lower leads cannot be bent or flexed to a great extent without endangering the integrity of the insulation. Provision may also be made for cooling the lower leads with a fluid, either gas or liquid, since the very high current densities in the lower leads generate heat which must be removed to prevent the insulation from being damaged by excessive temperatures.

Accordingly, one object of the present invention is to provide an improved flexible insulated joint for high voltage insulated electrical conductors.

Another object of the invention is to provide a high voltage insulated flexible joint with means for fluid-cooling the members.

Still another object of the invention is to provide an improved lower lead for a dynamo electric machine which includes provisions for movement between upper and lower portions of the lower lead and means for cooling the lead with either gas or liquid, or both.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is an elevation view, partly in section, showing the lower lead together with associated portions of a fluid-cooled dynamo electric machine, FIG. 2 is a view of the flexible joint portion of the lower lead, partly in section, looking in an axial direction from the end of the machine, FIG. 3 is an enlarged perspective view of one type of flexible strap used in the invention, and FIGS. 4 and 5 are views similar to those of FIGS. 1 and 2, but illustrating a modified form of the invention.

Briefly stated, the invention is practiced by providing a flexible strap connecting the bare terminating end portions of insulated electrical conductors and employing a pair of hollow telescoped insulating tubes surrounding the flexible strap, whose walls are spaced apart far enough to allow for movement of the conductor end portions but close enough to provide an insulating creepage gap to insulate the strap.

Referring now to FIGURE 1 of the drawing, a generator lower lead, shown generally as 1, includes an upper portion 2, and a lower portion 3. Lower lead 1 is disposed in a gas-tight generator casing filled with hydrogen cooling gas. Coolers and fans (not shown) are employed to cool and recirculate the cooling gas between various chambers in the generator. Attached to an outer wall 4, of the generator casing is a downwardly extending bushing housing 5, one wall of which is seen as 5a, with a bottom closure plate 6, bolted thereto. The end of the generator is divided into regions of high and low gas pressure by dividing walls, two of which are seen at 7 and 8. On the right of wall 7 is a low pressure chamber 9, connected by passages (not shown) to the low pressure side of the recirculating fan, and on the left-hand side of wall 7, extending downward into the bushing housing is a high pressure chamber 10, connected through various passages to the discharge side of the recirculating fan. It will be apparent that cooling gas will flow from high pressure chamber 10 to low pressure chamber 9, through various passages in the members to be cooled.

The lower portion 3, of the lower lead is electrically connected to a high voltage terminal bushing 11. The details of bushing 11 are not material to the present invention, but it may be similar to the gas-cooled high voltage bushing for a large generator, particularly disclosed in U.S. Patent 2,742,582, issued to J. J. Bahn et al., on April 17, 1956, and assigned to the assignee of the present application. Bushing 11 includes a conductive portion 12, through which extends a coolant outlet passage 13. The bushing 11 also includes a cooling inlet tube 14, communicating with high pressure gas chamber 10. The bushing is cooled by gas entering inlet 14, flowing through the bushing conductors, and leaving by way of outlet passage 13.

The upper part 2 of the lower lead 1 is electrically connected to an arcuate connection ring 15, seen in cross section, which is electrically connected to the phase leads from the generator stator winding (not shown). It should be particularly noted that connection ring 15 is free to move back and forth in the direction indicated by the dotted arrow during normal operation of the generator due to the thermal expansion and contraction of the windings to which it is connected. Free movement of connection ring 15, and the connected end turns of the windings may be provided by an end winding and connection ring support system similar to that disclosed in U.S. Patent 3,089,048, issued to J. J. Bahn, A. D. Coggeshall, R. T. Maher, and J. B. Waldbillig on May 7, 1963, and assigned to the assignee of the present application. It is the movement of connection ring 15 as indicated by the dotted arrow which gives rise to the problems overcome by the present invention.

The connection ring 15, as well as the upper portion 2, of the lower lead are cooled by a fluid, in this case a liquid. The liquid flows through an internal cooling passage 16 in connection ring 15, which is connected to cooling passage 31 inside the conductor of upper portion 2 of the lower lead. The liquid which cools connection ring 15 and upper portion 2 may be cooled and recirculated by a suitable pump and cooling system (not shown). The same liquid is also customarily used to cool hollow strands in the stator winding. A suitable liquid cooling circuit is disclosed in co-pending application 163,788 filed in the names of J. J. Bahn and W. L. Dormandy on January 2, 1962, and assigned to the assignee of the present application.

The lower portion 3 of the lower lead is rigidly held with respect to the stationary structure of the generator by a "standoff insulator" 18, attached to wall 5a of the bushing housing. Standoff insulator assembly 18 includes a porcelain tube 19, supported by a hollow metal tube 20 attached to wall 5a. Another tube 21, connects the inside of tube 20 with the region of low pressure 9. Porcelain tube 19 has an internal passage 22 communicating with tubes 20, 21.

Lower portion 3 of the lower lead includes an insulated hollow conductor section 24, an insulated electrically conducting fitting 25, and an uninsulated or bare terminating end portion 26, all of which are electrically connected to one another and to the conductor 12 of bushing 11. Fitting 25 includes a chamber 27, which communicates with bushing outlet passage 13 through hollow conductor section 24 and which also communicates with holes 28 extending through the bare terminating end portion 26. Gas from bushing outlet 13 flows through conductor 24 into chamber 27, through passage 22 and thence to the low pressure chamber 9, through the standoff insulator assembly 18, thereby cooling the conductors of the lower portion 3.

Reference to FIG. 2 shows that the upper portion 2 of the lower lead includes a hollow conductor section 29 covered by insulation 29a and electrically connected to an uninsulated end portion 30. The insulated portion 29, includes parallel internal inlet and outlet passages 31, 32, respectively, connected by a small crossover passage 33 near the terminating end portion 30. Cooling liquid thus flows in a U-shaped path to and from connection ring 15 to cool upper portion 2 of the lower lead.

A funnel-shaped insulating boot 45 provides an extension to the insulation 29a around conductor 29. An insulating "potting" compound 46 fills the space between the large end of the boot and conductor 29.

In accordance with the invention, the uninsulated terminating end portions 26, 30, are substantially aligned with one another along the axis thereof and spaced apart to provide for transverse movement. Portions 26, 30, are electrically connected by means of a number of flexible strap assemblies, one of which is seen as 34. By reference to FIGS. 1 and 2 together, it will be seen that, in the embodiment shown, there are six such strap assemblies 34, which are attached to the end portions 26, 30, by bolts seen at 35, 36, respectively.

The number and details of flexible straps 34, may vary considerably according to the application, but an enlarged view of the strap of the present invention is seen in perspective view in FIGURE 3. There it will be seen that each strap assembly consists of a number of stacked copper leaves 37, which are relatively thin so as to offer little resistance to bending in the direction shown by arrow 38. Leaves 37 are of such a length that when bolted between end portions 26, 30, the length of strap between end portions is longer than the spacing between end portions as evidenced by the arced section 34a. This allows for the increased spacing between bolts 35, 36 when transverse movement of the upper portion 30, takes place. For a typical application, strap assembly 34, might require five such copper leaves about .075" thick and 2" wide.

In order to provide for the fact that the terminating end portions 26, 30, and connecting straps 34, would be essentially uncooled and uninsulated, and also for the fact that end portions 26, 30 move with respect to one another in a transverse direction, the following combination of means are employed. Attached to lower and upper end portions 26, 30, are transversely extending collars 39, 40, respectively made of insulating material, for example, Textolite. Connected to the outer edges of collars 39, 40, are coaxial telescoped or overlapping insulating tubes 41, 42. Tubes 41, 42, may be of any desired shape to correspond with the shape of the conductor end portions, but here are rectangular as seen in FIGURES 1 and 2. Tubes 41, 42, overlap longitudinally over the distance indicated by bracket 43, and are spaced apart from one another by a transverse spacing 44 (see FIG. 1). Spacing 44, is the maximum anticipated distance that the upper portion 2 can be expected to move with respect to the lower portion 3 of the lower lead. Thus, movement between upper and lower portions 2, 3, can take place to the extent provided by spacing 44 without stressing or mechanically damaging the high voltage insulation of the relatively rigid upper and lower portions 2, 3.

Tubes 41, 42, are constructed of insulating material, for example, polyester glass, and the length 43, of the gap between tubes is selected with respect to the width 44 of the gap to give an insulating creepage gap sufficient to prevent arcing or corona between the uninsulated members 26, 30, 34, and the grounded generator structure.

Cooling flow to cool the uninsulated members 26, 30, 34, is provided by gas flowing from high pressure chamber 10, in the direction indicated by the arrows through the creepage gap between tubes 41, 42, around the members 26, 30, 34 in direct contact therewith to promote increased cooling, and thence out through passage 28 to join with the gas from the gas-cooled bushing 11. The size of passage 28 may be appropriately selected to provide the desired amount of cooling.

The operation of the invention will be apparent from the following summary. Upper portion 2 can move transversely with respect to the lower portion 3 of the lower lead by virtue of the flexibility and extra length in the flexible straps 34. Insulation of the bare connecting members during movement is provided by the telescoping cylinders 41, 42, which are spaced apart from one another by a sufficient amount to allow for the maximum anticipated movement. The spacing between tubes 41, 42, also provides an insulating creepage gap to insulate the members. The conductor 29 of upper portion 2, is cooled by a separate liquid cooling circuit, although gas could also be used. The conductors of the lower portion 3 of the lower lead are cooled by gas, although as will be explained, liquid could be employed. The uninsulated members 26, 30, 34 of the flexible joint are cooled by gas flowing from the high pressure chamber 10, through the gap between tubes 41, 42 and out holes 28 in the bare terminating end portion 26, although it will be apparent that gas could flow out of both of the terminating end portions by suitable modification. Also, the direction of gas flow could be reversed from that shown and enter the flexible joint enclosure from one or both of the terminating portions 26, 30, to then flow outward through the gap 44.

FIGS. 4 and 5 of the drawing illustrate a modification of the invention, wherein both the upper and lower conductor portions of the flexible joint are cooled by liquid. FIG. 4 corresponds to the view of the flexible joint in FIG. 1, looking in a circumferential direction, and FIG. 5 corresponds to FIG. 2, looking in an axial direction. Where the construction of the elements of FIGS. 4 and 5 is the same as those in FIGS. 1 and 2, the same reference numerals have been employed.

The basic construction of the flexible strap assemblies 34 and the spaced telescoping insulating tubes 41, 42 is the same as in FIGS. 1 and 2. The difference in the modification lies in that the lower conductors, as well as the upper conductors of the lower lead are cooled by liquid. The bare uninsulated members of the flexible joint are cooled by gas as before.

The uninsulated terminating end portion attached to upper conductor 29 is designated by numeral 47. Extending through member 47 are parallel passages 48, 49 which are connected to liquid passages 31, 32 respectively in conductor 29. The lower conductor 50 is connected to a terminating uninsulated end portion 51. Member 51 likewise includes parallel liquid cooling passages 52, 53, the upper ends of which are aligned with passages 48, 49 in member 47. A pair of flexible hoses 54, 55 are attached with liquid-tight connections between passages 48, 52 and passages 49, 53 respectively. Hoses 54, 55 are of a greater length than the distance between end portions 47, 51, as illustrated, in order to allow relative movement between end portions. It remains to note that the lower conductor 50 also includes an additional gas outlet passage 56 leading to a standoff insulator (not shown, but similar to insulator 19 of FIG. 1).

The operation of the modification of FIGS. 4 and 5 is as follows. The modification is primarily designed for use with a liquid-cooled rather than a gas-cooled bushing. Liquid flows downward from the connection rings through passages 31, 48, hose 54, passage 52, and from there to the bushing (not shown). After cooling the bushing it flows back upward through passage 53, hose 55, passage 49, and passage 32 back to the connection ring.

Cooling of the uninsulated end portions 47, 51 and strap assemblies 34 is as before, with gas flowing through the creepage gap 44, around the uninsulated members, and out passage 56.

The assembly of the flexible joint either in the preferred embodiment or in the modification is similar. The insulating boot 45 is placed over conductor 29 and slid upward so as to be out of the way. Then the assembly is built up from the inside to the outside after first placing insulating tubes 41, 42 and collars 39 in place. Lastly, the potting compound 46 is applied and insulating boot 45 slid downward into place.

Thus it can be seen that the joint provides relative movement between portions of the lower lead and at the same time incorporates provisions for cooling the uninsulated members through the gap between telescoped tubes, the gap also serving as an insulating creepage gap. As illustrated in the drawings, the upper and lower insulated conductors 29, 50 can be cooled by a separate fluid or can utilize the fluid which cools the uninsulated members.

Although the invention has been shown as applied particularly to the lower lead of a dynamoelectric machine, the principles shown are applicable to other types of cooled or flexible insulating joints for other types of high voltage electrical conductors, wherein relative movement must take place.

While there has been shown what is considered to be the preferred embodiment of the invention, with one modification thereof, other modifications will occur to those skilled in the art. It is, of course, intended to cover in the appended claims all such modifications which fall within the true spirit and scope of the invention.

What I claim as new and desire to secure by Letters Patent of the United States is:

1. In a high voltage conductor, the combination of:
   first and second relatively rigid insulated electrical conducting members having first and second uninsulated terminating end portions, said end portions being in line but spaced apart from one another,
   at least one electrically conductive flexible strap connected between said end portions, the strap length between end portions being greater than the spacing between end portions,
   first and second hollow insulating tubes attached with a fluid-tight seal to the first and second conducting members respectively and extending around the uninsulated end portions thereof to define a chamber, said tubes having overlapping end portions transversely spaced from one another to provide for transverse relative movement between the conducting members, the length of the overlapping end portions of said tubes also being selected to provide an insulating creepage gap at least equivalent to the insulation on the conducting members,
   conduit means leading from the chamber enclosed by the overlapping insulating tubes, and
   means causing cooling fluid to flow in a path including said conduit means and said transverse spacing between insulating tubes to cool the flexible strap and uninsulated end portions.

2. In a high voltage electrical conductor, the combination of:
   first and second relatively rigid insulated electrical conducting members defining cooling passages therein and having first and second uninsulated terminating end portions, said end portions being in line but spaced apart from one another,
   a plurality of electrically conductive multi-layer flexible straps connected between said end portions, said straps including an arcuate section between end portions to provide for transverse movement of the end portions relative to one another,
   first and second hollow insulating tubes attached with a fluid-tight seal to the first and second conducting members respectively and extending around the uninsulated end portions thereof to define a chamber, said tubes having overlapping end portions transversely spaced from one another to provide for relative transverse movement between conducting members, the overlapped length of the end portions of the tubes also being selected to provide an insulating creepage gap at least equivalent to the insulation on the conducting members,
   conduit means defined in at least one of the conductor end portions connecting one of said conductor cooling passages with the chamber enclosed by the insulated tubes, and
   means causing cooling gas to flow in a path including the transverse gap between insulating tubes and said conduit means so as to cool the exterior of the flexible strap and the interior of one of said conducting members.

3. The combination according to claim 2 wherein said conduit means is defined by only one of said conductor end portions, and including means recirculating cooling liquid through the cooling passages in the other conducting member to cool it separately from the first conducting member.

4. A high voltage lower lead for a fluid-cooled dynamo electric machine comprising:
   upper and lower rigid insulated electrical conducting members, said members defining cooling passages therein and having first and second uninsulated terminating end portions, said end portions being in line but spaced apart from one another,
   a plurality of multi-layer electrically conductive flexible straps connected between said end portions, said straps having arcuate sections between end portions to provide for transverse relative movement between end portions,
   first and second transversely extending insulating collars attached to the upper and lower conducting members near said end portions,
   first and second hollow insulating tubes attached to said first and second collars respectively and extending around the uninsulated end portions of the conducting members to define a chamber, said tubes being arranged in telescoping fashion with overlapping ends transversely spaced from one another to provide for transverse relative movement between conducting members, the overlapped length of said tubes being selected to provide an insulating creepage gap,
   conduit means defined in the first conducting member connecting its cooling passage with the chamber enclosed by the insulating tubes,
   means causing cooling gas to flow in a path including the gap between insulating tubes and through said conduit means to cool said straps, said end portions, and the interior of the first conducting member, and
   means causing cooling liquid to flow through the cooling passages in the second conducting member so as to cool it separately from the first conducting member.

5. In a high voltage electrical conductor, the combination of:
   first and second relatively rigid insulated electrical conducting members defining cooling passages extending therethrough and having first and second uninsulated terminating end portions, said end portions being in line but spaced apart from one another, a plurality of electrically conductive flexible straps connected between said end portions, said straps including an arcuate section between end portions to provide for transverse movement of the end portions relative to one another, first and second hollow insulating tubes attached with a fluid-tight seal to the first and second conducting members respectively and extending around the uninsulated end portions thereof to define a chamber, said tubes having overlapping end portions transversely spaced from one another to provide for relative transverse movement between conducting members, the overlapped length of the end portions of the tubes also being selected to provide an insulating creepage gap at least equivalent to the insulation on the conducting members, flexible hose means connecting said conducting member cooling passages between terminating end portions thereof, the hose length between end portions being of a length greater than the spacing between said end portions, conduit means leading from the chamber enclosed by the overlapping insulating tubes, means causing cooling gas to flow in a path including the gap between insulating tubes and said conduit means, and means causing cooling liquid to flow through said cooling passages and flexible hose means to cool the first and second conducting members.

References Cited in the file of this patent

UNITED STATES PATENTS

| | | |
|---|---|---|
| 2,455,998 | Hoye | Dec. 14, 1948 |

FOREIGN PATENTS

| | | |
|---|---|---|
| 132,216 | Great Britain | Sept. 11, 1919 |
| 601,259 | Great Britain | May 3, 1948 |